US010691594B2

(12) United States Patent
Sukhomlinov et al.

(10) Patent No.: US 10,691,594 B2
(45) Date of Patent: Jun. 23, 2020

(54) SELECTIVE EXECUTION OF CACHE LINE FLUSH OPERATIONS

(71) Applicant: Intel Corporation, Santa Clara, CA (US)

(72) Inventors: Vadim Sukhomlinov, Santa Clara, CA (US); Kshitij Doshi, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 4 days.

(21) Appl. No.: 16/023,717

(22) Filed: Jun. 29, 2018

(65) Prior Publication Data

US 2019/0042417 A1    Feb. 7, 2019

(51) Int. Cl.
| | |
|---|---|
| *G06F 12/08* | (2016.01) |
| *G06F 12/0804* | (2016.01) |
| *G06F 12/0875* | (2016.01) |
| *G06F 12/0891* | (2016.01) |

(52) U.S. Cl.
CPC ...... *G06F 12/0804* (2013.01); *G06F 12/0875* (2013.01); *G06F 12/0891* (2013.01); *G06F 2212/1032* (2013.01); *G06F 2212/1052* (2013.01); *G06F 2212/452* (2013.01); *G06F 2212/502* (2013.01)

(58) Field of Classification Search
CPC ............. G06F 12/0804; G06F 12/0875; G06F 2212/1032; G06F 2212/452
See application file for complete search history.

(56) References Cited

U.S. PATENT DOCUMENTS

| | | | |
|---|---|---|---|
| 6,546,462 B1 * | 4/2003 | Palanca | G06F 12/0804 711/135 |
| 9,405,708 B1 * | 8/2016 | Pohlack | G06F 21/54 |
| 9,436,603 B1 * | 9/2016 | Pohlack | G06F 21/556 |
| 10,311,229 B1 * | 6/2019 | Pohlack | G06F 21/54 |
| 2018/0285264 A1 * | 10/2018 | Kayiran | G06F 12/0806 |

OTHER PUBLICATIONS

Lipp, Moritz et. al., Meltdown, 27th {USENIX} Security Symposium ({USENIX} Security 18), 2018, 16 pages.
Kocher, Paul, et al., Spectre Attacks: Exploiting Speculative Execution, 40th IEEE Symposium on Security and Privacy (S&P'19)2018, 19 pages.

* cited by examiner

*Primary Examiner* — Ryan Bertram
(74) *Attorney, Agent, or Firm* — Grossman, Tucker, Perreault & Pfleger, PLLC (57) ABSTRACT

The present disclosure is directed to systems and methods that include cache operation storage circuitry that selectively enables/disables the Cache Line Flush (CLFLUSH) operation. The cache operation storage circuitry may also selectively replace the CLFLUSH operation with one or more replacement operations that provide similar functionality but beneficially and advantageously prevent an attacker from placing processor cache circuitry in a known state during a timing-based, side channel attack such as Spectre or Meltdown. The cache operation storage circuitry includes model specific registers (MSRs) that contain information used to determine whether to enable/disable CLFLUSH functionality. The cache operation storage circuitry may include model specific registers (MSRs) that contain information used to select appropriate replacement operations such as Cache Line Demote (CLDEMOTE) and/or Cache Line Write Back (CLWB) to selectively replace CLFLUSH operations.

15 Claims, 4 Drawing Sheets

SELECTIVE EXECUTION OF CACHE LINE FLUSH OPERATIONS

TECHNICAL FIELD

The present disclosure relates to computer security, specifically detection and/or prevention of side-channel attacks.

BACKGROUND

Side-channel attacks gained widespread notoriety in early 2018. A side-channel attack includes any attack based on information gained from the implementation of a computer system, rather than weaknesses in the implemented algorithm itself. Such side-channel attacks may use timing information, power consumption, electromagnetic leaks or even sound as an extra source of information, that is exploited to obtain information and/or data from the system. Side-channel attacks include Spectre and Meltdown, both of which rely on deducing whether data originates in a cached or un-cached location. To a significant degree, the determination of where data originates relies upon the precise timing of events such as loads from memory space.

Modern operating systems map the kernel into the address space of every process executed by the processor. Access to the kernel space is restricted using a supervisor bit of the processor that is set to permit kernel access to the kernel space and is reset to block or prohibit user access to the kernel space. Meltdown overcomes this memory isolation, thereby permitting the user process to read the entire kernel memory of the machine executing the user process. Meltdown relies upon out-of-order execution to obtain data from the kernel space. CPUs supporting out-of-order execution support running operations speculatively to the extent that processor's out-of-order logic processes instructions before the CPU is certain whether the instruction is valid and committed. Meltdown reads information from the protected kernel space by causing the processor to execute multiple instructions such as:

```
data=getByte(kernelAddress)
variable=probeArray(data)
```

The "getByte" instruction will ultimately fail because of the prohibited read of kernel memory. However, the simultaneous access of an element in "probeArray" will pull the data from "probeArray" into cache. By timing reads at addresses from 0 to 255 in cache, the attacker is able to deduce the content of "kernelAddress."

For example, after flushing the cache, the Meltdown attacker retrieves a value "01000000" (binary "64") from a first address in the kernel memory. Prior to the processor generating an exception to the unauthorized read from kernel memory, the attacker uses retrieved kernel data as an index to access element "64" in a known array located in user space. The processor retrieves the value of array element 64 and loads the value into cache. The attacker then attempts to read every element from the array—access times for elements 0-63 and 65-255 will be relatively long as the data is retrieved from main memory. However the access time for element 64 will be considerably shorter as the data need only be retrieved from the cache. From this the attacker can deduce the data the first address in kernel memory is "0100000". By performing the action for every location in kernel memory, the attacker is able to read the contents of the kernel memory.

A first class of Spectre attacks takes advantage of branch target misprediction by a CPU to read data from memory into cache. Upon detecting the misprediction, the CPU clears the data from the pipeline, but the data read into cache remains. A covert side-channel may then be used to obtain the residual data from the cache. In this class of attack, the attacker trains the branch predictor in a system to take a particular branch. For example, using the following instructions, an attacker may train the system by providing values for "x" that are consistently smaller than the size of "array1." The attacker thus trains the system to speculatively execute the subsequent instruction based on the assumption that the branch has been historically true:

```
if ( x < array1.size( )) {
    int value = array2[array1[x] * 256] // branch 1
}
```

After training the system, the attacker sets the cache to a known state and provides a value of "x" that exceeds the size of "array1." Having been previously trained that "x" is typically less than the size of "array1," the processor executes the branch instruction (prior to the processor throwing the exception due to "x" being greater than the size of "array1") and uses the value found at address "x" as an index to look up the value at address "x" in array2. The processor loads the value at address "x" in array2 into cache. The attacker then reads all of the values of array2 and is able to determine the value of "x" as the address in array2 having the shortest access time.

For example, assume array1 has 256 elements addressed "0" to "255." The attacker provides values of "x" between 0 and 255 to train the system that the branch instruction is routinely executed. The attacker then sets the cache to a known state and provides a value of 512 for "x" (i.e., a value greater than 255). The value "01000000" (i.e., "64") at memory location 512 is read. The processor then looks up the value of array2 at address 64*256 and loads the value into cache. The attacker then examines the read time for each element in array2, the read time for element at address 64*256 will be less than the read time for the other array2 addresses, providing the attacker the information that the address at memory location 512 is "01000000" or "64." By performing the action for every memory location, the attacker is able to read the contents of the memory byte-by-byte.

A second class of Spectre attacks exploits indirect branching by poisoning the Branch Target Buffer (BTB) such that a CPU speculatively executes a gadget that causes the CPU to read data from memory into cache. Upon detecting the incorrect branching, the CPU clears the data from the pipeline but, once again, the data read into cache remains. A covert side-channel may then be used to obtain the residual data from the cache. In this class of attack, the attacker poisons the BTB of the victim system by repeatedly performing indirect branches to a virtual address in the victim's system that contains the gadget. For example, an attacker may control the content of two registers (R1, R2) in the victim's system at the time an indirect branch occurs. The attacker must find a gadget in the victim's system that, upon speculative execution by the victim's CPU, leaks data from selected memory locations in the victim's system. The gadget may be formed by two instructions, the first of which contains an instruction that mathematically and/or logically (add, subtract, XOR, etc.) combines the contents of register R1 with another register in the victim's system and stores the result in R2. The second instruction reads the contents of register R2, storing the value in R2 in cache.

For example, the attacker may control two registers in the victim system, ebx (R1) and edi (R2). The attacker then finds two instructions on the victim's system, such as:

| | |
|---|---|
| adc | edi,dword ptr [ebx+edx+13BE13BDh] |
| adc | dl,byte ptr [edi] |

By selecting ebx=m—0x13BE13BD—edx the attacker is able to read the victim's memory at address "m." The result is then added to the value in edi (R2). The second instruction in the gadget causes a read of R2 which contains the sum of "m" plus the attacker's value initially loaded into edi, transferring the value into the cache. By detecting the location of R2 within the cache using a side-channel timing attack, the attacker is able to determine the value of "m."

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Speculative execution beneficially increases the speed of a system by allowing the processor to execute instructions independent of data and/or input/output (I/O) access. With speculative execution, a high percentage of the executed instructions will be needed by an application executed by the processor. Speculatively executed instructions may cause a change in cache state (i.e., may cause a cache write operation as a result of a data move or similar instruction) regardless of whether the instruction completes successfully and is "retired" or fails to complete successfully and remains "unretired." It is the existence of this vestigial data in the cache that serves as the target for side-channel attacks such as Spectre and Meltdown. During a Spectre or Meltdown attack, the processor executes one or more impermissible instructions that will ultimately cause an exception. However, data may be transferred to the cache prior to the system generating the exception to the impermissible instruction. One such impermissible instruction may include reading data from secure or protected memory locations, such as reading data from memory addresses reserved for the system kernel.

Spectre and Meltdown take advantage of the data transferred to the cache during the pendency of the instruction execution (i.e., before the processor is able to generate an exception). However, Spectre and Meltdown depend upon placing the cache in a known state, for example by executing a cache line flush (CLFLUSH) operation, prior to causing a transfer of data into the cache. By determining the location of the data transferred into cache, Spectre and Meltdown are able to infer information about the data itself. When performed repeatedly, Spectre and Meltdown are able to read large portions of system memory, including reserved and/or protected memory space that may contain secrets such as passwords, account information, and similar.

Thus, timing based side-channel attacks take advantage of the relatively shorter time required to access data stored in the cache (e.g., 10's of nanoseconds) as compared to the relatively longer time required to access data in main memory (e.g., 100's of nanoseconds). Such attacks depend upon placing the cache in a known state as to not "pollute" the cache with data transfers by other applications. A typical timing based side-channel attack may perform a number of CLFLUSH operations, each preceding a transfer of data to the cache prior to determining (by inference) the surreptitiously obtained data based on reduced cache access times. The dependency of such attacks on accurate access time information and the repeated instructions such as CLFLUSH expose vulnerabilities in such timing based side-channel attacks.

The systems and methods disclosed herein beneficially and advantageously provide controllable semantics for CLFLUSH and cache line demote (CLDEMOTE) operations that compromise the ability for these operations to bring the cache to a known state. The systems and methods described herein beneficially permit the processor circuitry to select different interpretations of CLFLUSH that are applicable to applications running in user mode or in guest kernels. The CLFLUSH operation may be used to flush modified values for accelerating the values to memory, or for reducing cache pollution. Substituting a cache line writeback (CLWB) operation for the CLFLUSH operation effectively flushes the modified values to memory. Substituting a CLDEMOTE operation may reduce cache pollution, however substitution of a CLDEMOTE for a CLFLUSH operation should be offered to whitelisted applications. Thus, the systems and methods described herein cause the processor circuitry to perform substitute operations depending on the choice exercised by the operating system, virtual machine manager, and BIOS: at the user/guest kernel level make CLFLUSH one of: an invalid operation, a no operator (NOP); equivalent to a CLWB operation; or equivalent to a combination of a CLWB operation and a CLDEMOTE operation.

A CPU Cache instruction substitution system is provided. The system may include: processor circuitry; processor cache circuitry coupled to the processor circuitry; cache operation storage circuitry; a non-transitory storage device that includes machine-readable instructions that, when executed, cause the processor circuitry to, upon receipt of a cache line flush (CLFLUSH) operation: detect an execution mode of a requestor of the CLFLUSH operation; and based on the detected execution mode of the requestor of the CLFLUSH operation, cause an execution of at least one of: the CLFLUSH operation; or one or more alternative operations selected from the cache operation storage circuitry in place of the CLFLUSH operation.

A CPU Cache instruction substitution method is provided. The method may include: detecting, by processor circuitry, an execution mode of a requestor of a CLFLUSH operation; and selectively executing by the processor circuitry, based on the detected execution mode of the requestor of the CLFLUSH operation, at least one of: the CLFLUSH operation; or one or more alternative operations in place of the CLFLUSH operation the one or more alternative operations selected from cache operation storage circuitry coupled to the processor circuitry.

A CPU Cache instruction substitution system is provided. The system may include: means for detecting an execution mode of the requestor of a CLFLUSH operation; and means for selectively executing, based on the detected execution mode of the requestor of the CLFLUSH operation, at least one of: the CLFLUSH operation; or one or more alternative operations in place of the CLFLUSH operation the one or more alternative operations selected from cache operation storage circuitry coupled to the processor circuitry.

A non-transitory machine-readable storage medium containing instructions is provided. The machine-readable instructions, when executed by processor circuitry, cause the processor circuitry to: detect an execution mode of the requestor of a CLFLUSH operation; and selectively execute, based on the detected execution mode of the requestor of the CLFLUSH operation, at least one of: the CLFLUSH operation; or one or more alternative operations in place of the CLFLUSH operation the one or more alternative operations selected from cache operation storage circuitry coupled to the processor circuitry.

An electronic device is provided. The electronic device may include: a printed circuit board; processor circuitry coupled to the printed circuit board; processor cache circuitry coupled to the processor circuitry; cache control instruction storage circuitry; a non-transitory storage device that includes machine-readable instructions that, when executed, cause the processor circuitry to, upon receipt of a cache line flush (CLFLUSH) operation: detect an execution mode of the requestor of the CLFLUSH operation; and based on the detected execution mode of the requestor of the CLFLUSH operation, cause an execution of at least one of: the CLFLUSH operation; or one or more alternative operations selected from the cache operation storage circuitry in place of the CLFLUSH operation.

As used herein, the term "processor cache" and "cache circuitry" refer to cache memory present within a processor or central processing unit (CPU) package. Such processor cache may variously be referred to, and should be considered to include, without limitation, Level 1 (L1) cache, Level 2 (L2) cache, Level 3 (L3) cache, and/or last or lowest level cache (LLC).

Figure 1:
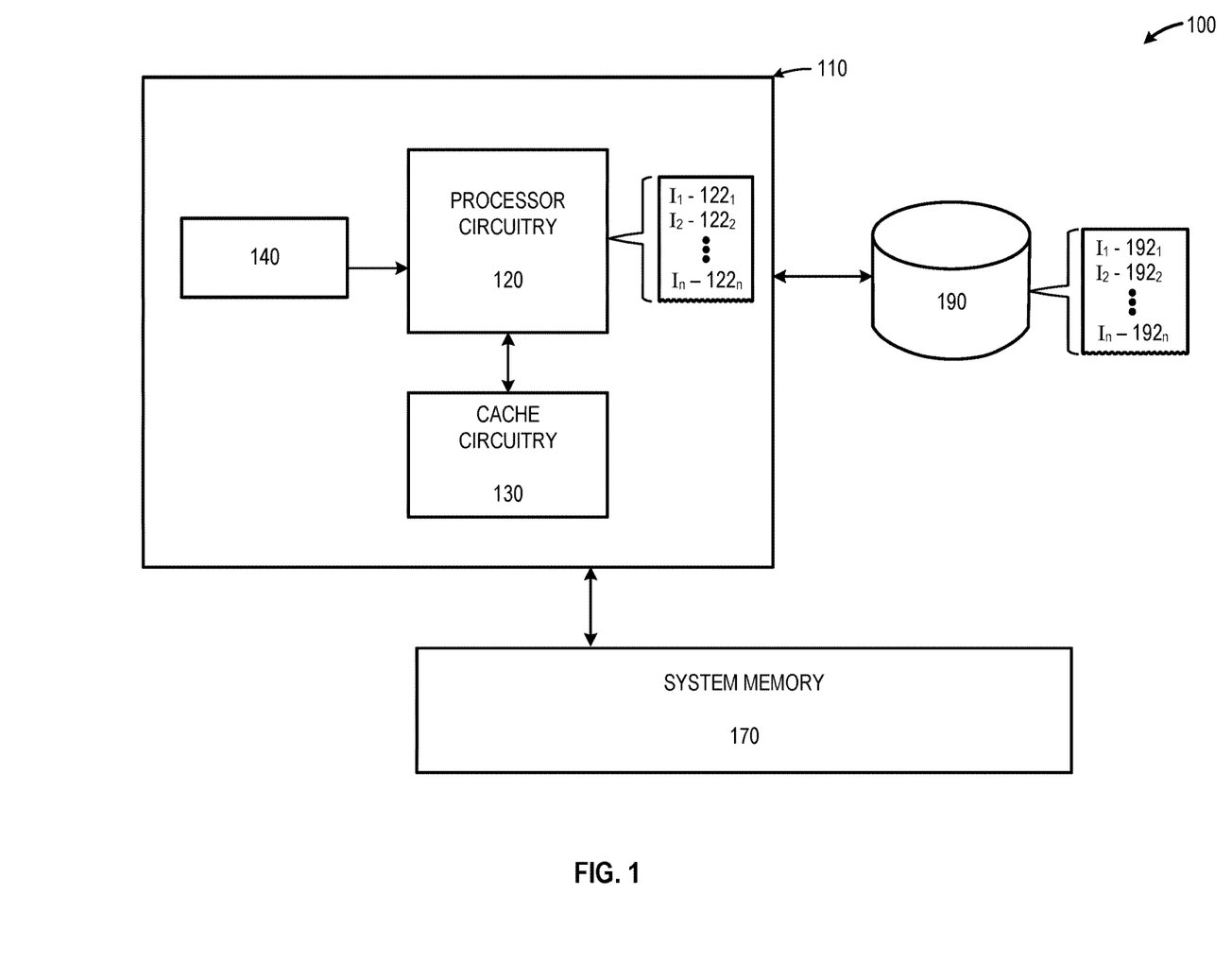
FIG. 1 provides a high level block diagram of an illustrative system capable of selective execution of cache line flush (CLFLUSH) operations through the selective substitution of one or more alternative operations for the CLFLUSH operation, in accordance with at least one embodiment described herein.

FIG. 1 provides a high level block diagram of an illustrative system 100 capable of selective execution of cache line flush (CLFLUSH) operations through the selective substitution of one or more alternative operations for the CLFLUSH operation, in accordance with at least one embodiment described herein. As depicted in FIG. 1, the system 100 includes a central processing unit (CPU) 110 coupled to system memory 170 and one or more storage devices 190 having machine-readable instructions stored or otherwise retained thereon. The CPU 110 includes processor circuitry 120, cache circuitry 130, and cache operation storage circuitry 140 that includes data representative of one or more alternative operations selectively performed by the processor circuitry 120 instead of executing an instruction that includes a CLFLUSH operation. The one or more alternative operations may be selected based upon the initiator (e.g., host/guest; user application/kernel) of the CLFLUSH operation. For example, the processor circuitry 120 may perform the CLFLUSH operation responsive to a request received from/generated by the host kernel and may perform the one or more alternative operations responsive to a request received from/generated by a user application executed on the host system or a guest system.

The processor circuitry 120 selects the one or more alternative operations from one or more data stores, data structures, and/or databases stored or otherwise retained in the cache operation storage circuitry 140. The processor circuitry 120 may select the same or different alternative operations in response a CLFLUSH operation received from at least one of: a host device user application; a guest kernel; or a guest user application. In embodiments where the CLFLUSH operation is enabled, the processor circuitry 120 may permit the selective execution of a CLFLUSH operation by a requestor having a defined privilege level, such as a Ring 0, kernel-level, instruction executed by a host system.

In embodiments, the CLFLUSH operation may be globally disabled such that the processor circuitry 120 returns an undefined opcode error upon attempting to execute a CLFLUSH operation. In some embodiments, the CLDEMOTE operation may be globally disabled such that the processor circuitry 120 returns an undefined opcode error upon attempting to execute a CLDEMOTE operation.

For example, where a user application on a host system attempts to execute a CLFLUSH operation, the processor circuitry 120 may receive data indicating one or more of the following alternative operations from the cache operation storage circuitry 140: handle the CLFLUSH as a no operation; handle the CLFLUSH operation as a cache line write back (CLWB) operation; or handle the CLFLUSH operation as a combination cache line write back (CLWB) operation and cache line demote (CLDMOTE) operation.

In another example, where the kernel on a guest system attempts to execute a CLFLUSH operation, the processor circuitry 120 may select one or more of the following alternative operations from the cache operation storage circuitry 140: handle the CLFLUSH as a no operation; handle the CLFLUSH operation as a cache line write back (CLWB) operation; handle the CLFLUSH operation as a combination cache line write back (CLWB) operation and cache line demote (CLDMOTE) operation; handle the CLFLUSH operation normally when in a trusted execution mode (e.g., TXT); or handle the CLFLUSH operation normally on defined memory pages.

In yet another example, where a user application on a guest system attempts to execute a CLFLUSH operation, the processor circuitry 120 may select one or more of the following alternative operations from the cache operation storage circuitry 140: handle the CLFLUSH as a no operation; handle the CLFLUSH operation as a cache line write back (CLWB) operation; or handle the CLFLUSH operation as a combination cache line write back (CLWB) operation and cache line demote (CLDMOTE) operation.

Thus, the processor circuitry 120 may alter the behavior of either or both the CLFLUSH operation and/or the CLDEMOTE operation on a global basis with a locking feature to prevent subsequent modification. In addition, the processor circuitry 120 permits the modification of the cache circuitry 130 by the host system kernel or a virtual machine manager when the CLFLUSH operation is initiated by a user application on the host system. Further, the processor circuitry 120 permits the modification of the cache circuitry 130 by the host system kernel or a virtual machine manager when the CLFLUSH operation is initiated by the kernel of a guest system. Additionally, the processor circuitry 120 permits the modification of the cache circuitry 130 by the guest system kernel when the CLFLUSH operation is initiated by a user application executed by a guest system.

As depicted in FIG. 1, the CPU 110 may include processor circuitry 120, cache circuitry 130, and kernel address detection circuitry 150. Example CPUs 110 may include, but are not limited to, microprocessors such as Intel Pentium® microprocessor, Intel Core™ Duo processor, Intel Core i3, Intel Core i5, Intel Core i7, AMD Athlon™ processor, AMD Turion™ processor, AMD Sempron™, AMD Ryzen® processor, and ARM Cortex® processors. In embodiments, the processor circuitry 120 may provide some or all of the circuitry and/or functionality of the cache operation storage circuitry 140.

The processor circuitry 120 includes any number and/or combination of electrical components, semiconductor devices, and/or logic elements capable of reading and executing machine-readable instruction sets. In embodiments, the processor circuitry 120 may include any number and/or combination of any currently available and/or future developed processors, microprocessors, controllers, logic elements, and similar. In embodiments, the processor circuitry 120 may include circuitry capable of performing some or all of: fetching instructions $122_1$-$122_n$, decoding the instructions $122_1$-$122_n$, scheduling the instructions $122_1$-$122_n$ for execution, and executing some instructions $122_1$ while speculatively executing other instructions $122_2$-$122_n$. In embodiments, the processor circuitry 120 may include one or more single- or multi-thread cores.

The cache circuitry 130 includes any number and/or combination of electrical components, semiconductor devices, and/or logic elements capable of non-persistently storing digital information and/or data. In embodiments, all or a portion of the cache circuitry 130 may be communicably coupled to a single processor circuit 120. In other embodiments, all or a portion of the cache circuitry 130 may be shared between multiple processor circuits $120_1$-$120_n$. In embodiments, the cache circuitry 130 may store information and/or data as a cache line, for example, as a 64-byte cache line. The cache circuitry 130 may bidirectionally communicate 132 information and/or data to the processor circuitry 120.

The cache operation storage circuitry 140 includes any number and/or combination of currently available and/or future developed electrical components, semiconductor devices, and/or logic elements capable of storing information and/or data representative of whether a CLFLUSH operation is enabled and whether the processor circuitry 120 should perform the CLFLUSH operation. For example, the information and/or data may indicate the processor circuitry 120 should perform the CLFLUSH operation in response to a CLFLUSH operation initiated by a host kernel and should perform one or more alternative operations in response to a CLFLUSH operation initiated by a user application. The cache operation storage circuitry 140 also includes information and/or data indicative of the one or more alternative operations performed by the processor circuitry 120 in lieu of performing a CLFLUSH operation. The cache operation storage circuitry 140 may store the information and/or data in any machine readable format, for example in a data store, data structure, or database.

The system memory 170 includes any number and/or combination of currently available and/or future developed electrical components, semiconductor devices, and/or logic elements capable of providing transitory storage for machine-readable instruction sets and data generated by the system kernel as well as by each system user. Example system memory 170 includes, but is not limited to: random access memory (RAM); dynamic random access memory (DRAM); optical memory; quantum memory; atomic memory; or combinations thereof. In some implementations, the system memory 170 may include one or more removable memory devices.

The storage device 190 may include any number and/or combination of currently available and/or future developed electrical components, semiconductor devices, and/or logic elements capable of storing machine-readable instructions $192_1$-$192_n$ (collectively, "instructions 192") that cause the processor circuitry to identify the requestor of a CLFLUSH operation. The instructions 192 may further cause the processor circuitry 120 to determine whether to execute a received CLFLUSH operation based, at least in part, on the identity of the requestor of the CLFLUSH operation. The instructions 192 may further cause the processor circuitry 120 to select one or more alternative operations from the cache operation storage circuitry 140 to replace the received CLFLUSH operation based, at least in part, on the identity of the requestor of the CLFLUSH operation.

Figure 2:
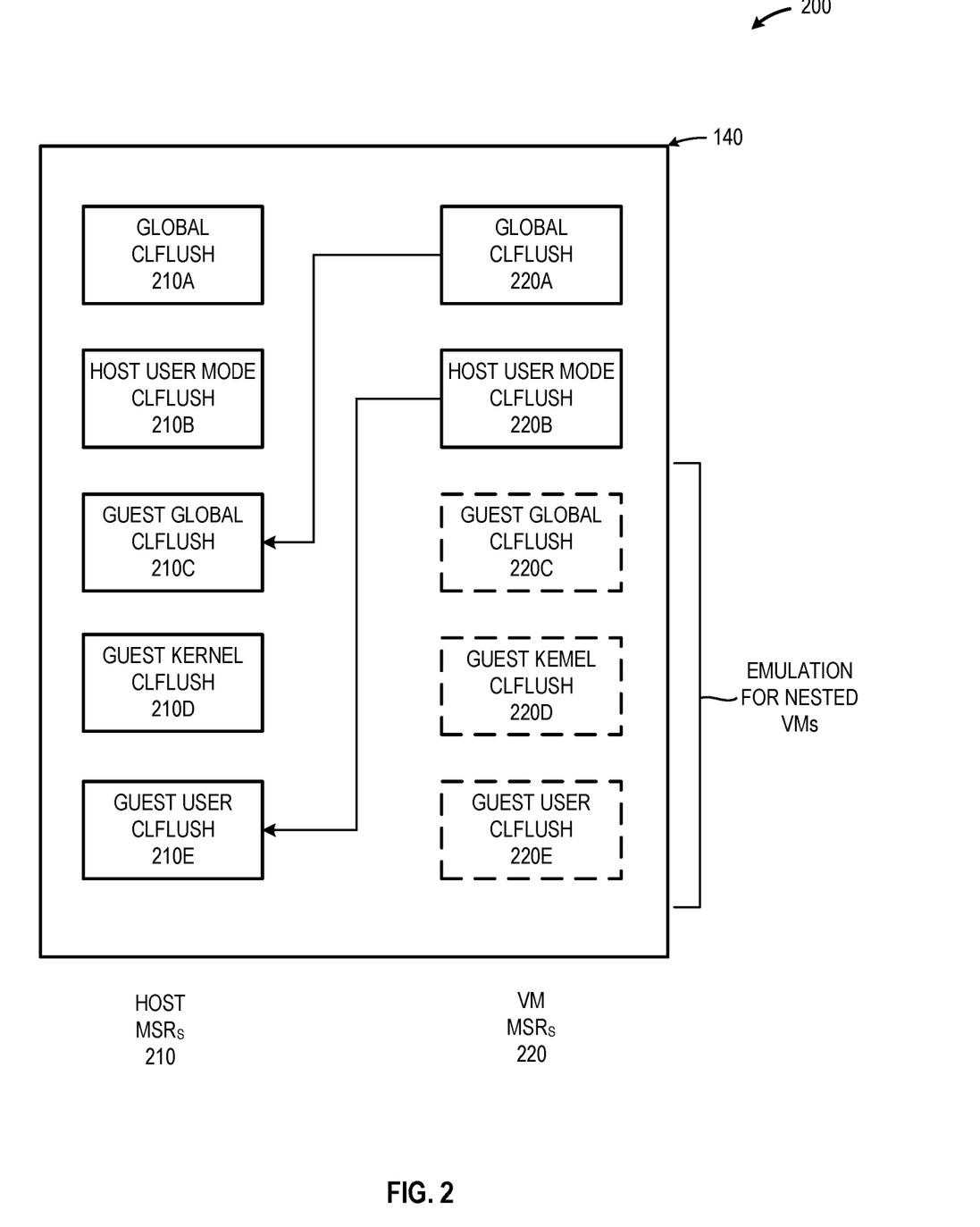
FIG. 2 is a block diagram of illustrative cache operation storage circuitry that includes a plurality of host model specific registers and a plurality of virtual machine model specific registers, in accordance with at least one embodiment described herein.

FIG. 2 is a block diagram of illustrative cache operation storage circuitry 140 that includes a plurality of host model specific registers 210A-210E (collectively, "host MSRs 210"), a plurality of virtual machine model specific registers 220A-220E (collectively, "VM MSRs 220"), in accordance with at least one embodiment described herein. As depicted in FIG. 2, in embodiments, at least a portion of the VM MSRs 220C-220E may include emulated MSRs associated with virtual machines that are "nested" beneath a primary virtual machine.

The Global Cache Line Flush (CLFLUSH) Control MSR 220A provides a control register used to store information and/or data associated with controlling global (i.e., system-wide) CLFLUSH behavior. In embodiments, the Global CLFLUSH Control MSR 220A provides the processor circuitry with information on how the CLFLUSH instruction should be interpreted when requested by a host/guest and/or a kernel/user application. In embodiments, the Global CLFLUSH Control MSR 220A may include one or more locking features that prevent alteration or modification of the contents of the Global CLFLUSH Control MSR 220A.

The Global CLFLUSH Control MSR 220A may be used by system BIOS, User Extensible Firmware Interface (UEFI), boot loader, and/or operating system kernel. The values written to the Global CLFLUSH Control MSR 220A include one or more CLFLUSH control bits that determine how the system handles CLFLUSH requests. The CLFLUSH control bits may: enable CLFLUSH and enable control over CLDEMOTE (the default); disable CLFLUSH globally such that an execution of CLFLUSH leads to an exception such as an undefined opcode exception; enable CLFLUSH and disable control over CLDEMOTE such that other MSRs may be inaccessible.

Additional values written to the Global CLFLUSH Control MSR 220A include one or more cache line demote (CLDEMOTE) control bits that determine how CLDEMOTE instructions are handled systemwide. The CLDEMOTE control bits may: enable CLDEMOTE and enable control over CLFLUSH (the default); disable CLDEMOTE globally such that an execution of CLDEMOTE leads to an exception, such as an undefined opcode exception; enable CLDEMOTE and disable control over CLFLUSH such that other MSRs may be inaccessible.

In Guest Virtual Machine CLFLUSH MSR 220A is accessible at same address as GLOBAL CLFLUSH 210A on the host to maintain same software access method in host and guest environments for same purpose. However, values written to CLFLUSH MSR 220A are accessible on the host under CLFLUSH MSR 210C address, so if needed, host can control Guest user mode behavior.

The Host User Mode CLFLUSH MSR 220B provides a control register used to store information and/or data associated with controlling CLFLUSH behavior for user applications executed by the host machine. The values written to the Host User Mode CLFLUSH MSR 220B include one or more CLFLUSH control bits that determine how the system handles CLFLUSH requests generated by a user application executed by the host machine. The Host User Mode CLFLUSH control bits may: disable CLFLUSH such that the CPUID for the user mode reports no support for CLFLUSH; enable CLFLUSH "as is;" interpret CLFLUSH as a "no operation" (NOP) while preserving access control to memory operand to avoid user disclosure that CLFLUSH is not available.

In embodiments, the Host User Mode CLFLUSH MSR 220B may include control bits that cause a host user CLFLUSH operation to be interpreted as a cache line writeback (CLWB) operation. In such embodiments, only a write back will occur as a result of a CLFLUSH instruction. Data will remain in the cache unchanged, however the cache line internal tags may be changed from "MODIFIED" to "EXCLUSIVE." Thus, an attacker is unable to bring the cache to a known state. In such embodiments, the semantic of the CLFLUSH is maintained for applications that may use a CLFLUSH operation to perform a write-back to memory.

In some embodiments, the Host User Mode CLFLUSH MSR 220B may include control bits that cause the processor circuitry 120 to interpret a host user CLFLUSH operation as a combined Cache Line Write Back (CLWB) and Cache Line Demote (CLDEMOTE) operation. This is similar in effect to a CLFLUSH operation, but still prevents an attacker from bringing the cache to a known state in preparation for a timing based, side channel attack since data may remain in the LLC.

Additional values written to the Host User Mode CLFLUSH MSR 220B include one or more cache line demote (CLDEMOTE) control bits that determine how host user CLDEMOTE operations are handled. The CLDEMOTE control bits may: disable CLDEMOTE; enable CLDEMOTE "as is;" or disable CLDEMOTE globally such that an execution of CLDEMOTE leads to an exception, such as an undefined opcode exception.

In Guest Virtual Machine CLFLUSH MSR 220B is accessible at same address as HOST USER MODE CLFLUSH 210B on the host to maintain same software access method in host and guest environments for same purpose. However, values written to CLFLUSH MSR 220B are accessible on the host under CLFLUSH MSR 210E address, so if needed, host can control Guest user mode behavior.

Registers CLFLUSH MSR 220C, 220D and 220E are virtual and maintained by software such as Virtual Machine Monitor (VMM) running on the host. If Guest virtual machine launches a nested Virtual Machine and wants to control CLFLUSH behavior for nested Guest Virtual Machine, these registers are employed to make Guest Virtual Machine look to software running in it expose same behavior as if same software will run on Host (make all CLFLUSH MSRs "architectural"—so software can access same registers for same purpose using same method and address, e.g. avoid different handling execution in guest and host modes).

The Guest Kernel Mode CLFLUSH MSR 220C provides a control register used to store information and/or data associated with controlling CLFLUSH behavior for kernel-level instructions received from guest systems. Some guest kernels may require CLFLUSH support to properly execute legacy drivers. In such instances, CLFLUSH may be enabled to maintain the validity of the CLFLUSH instruction if a guest kernel is executed in Ring 0. In such embodiments, the guest kernel may be verified against tampering or alteration (e.g., via a TXT measurement). The values written to the Guest Kernel Mode CLFLUSH MSR 220C include one or more CLFLUSH control bits that determine how the system handles CLFLUSH requests generated by a guest kernel. The Guest Kernel Mode CLFLUSH MSR control bits may: disable CLFLUSH such that the CPUID for the user mode reports no support for CLFLUSH; enable CLFLUSH "as is;" interpret CLFLUSH as a "no operation" (NOP) while preserving access control to memory operand to avoid user disclosure that CLFLUSH is not available; enable CLFLUSH for a trusted execution mode (e.g., TXT); and/or enable CLFLUSH for specific memory pages identified and/or controlled via an extended page table (EPT) attributes.

In embodiments, the Guest Kernel Mode CLFLUSH MSR 220C may include control bits that cause a host user CLFLUSH operation to be interpreted as a cache line writeback (CLWB) operation. In such embodiments, only a write back will occur as a result of a CLFLUSH instruction. Data will remain in the cache unchanged, however the cache line internal tags may be changed from "MODIFIED" to "EXCLUSIVE." Thus, an attacker is unable to bring the cache to a known state. In such embodiments, the semantic of the CLFLUSH is maintained for applications that may use a CLFLUSH operation to perform a write-back to memory.

In some embodiments, the Guest Kernel Mode CLFLUSH MSR 220C may include control bits that cause the processor circuitry 120 to interpret a host user CLFLUSH operation as a combined Cache Line Write Back (CLWB) and Cache Line Demote (CLDEMOTE) operation. This is similar in effect to a CLFLUSH operation, but still prevents an attacker from bringing the cache to a known state in preparation for a timing based, side channel attack since data may remain in the LLC.

Additional values written to Guest Kernel Mode CLFLUSH MSR 220C include one or more cache line demote (CLDEMOTE) control bits that determine how host user CLDEMOTE operations are handled. The CLDEMOTE control bits may: disable CLDEMOTE; enable CLDEMOTE "as is;" disable CLDEMOTE globally such that an execution of CLDEMOTE leads to an exception, such as an undefined opcode exception; enable CLDEMOTE for a trusted execution mode (e.g., TXT); and/or enable CLDEMOTE for specific memory pages identified and/or controlled via an extended page table (EPT) attributes.

The Guest User Mode CLFLUSH MSR 220E provides a control register used to store information and/or data associated with controlling CLFLUSH behavior for user applications executed by a guest virtual machine. The values written to the Guest User Mode CLFLUSH MSR 220E include one or more CLFLUSH control bits that determine how the system handles CLFLUSH requests generated by a user application executed by a guest machine. The Guest User Mode CLFLUSH MSR 220E may be accessible by the host kernel under a different address to differentiate the Guest User Mode CLFLUSH MSR 220E from the Host User Mode CLFLUSH MSR 220B. In addition, when the processor circuitry 120 is in virtual machine guest kernel mode, the Guest User Mode CLFLUSH MSR 220E may be accessible at the same address as the Host User Mode CLFLUSH MSR 220B. The Guest User Mode CLFLUSH control bits included in the Guest User Mode CLFLUSH MSR 220E may: disable CLFLUSH such that the CPUID for the user mode reports no support for CLFLUSH; enable CLFLUSH "as is;" interpret CLFLUSH as a "no operation" (NOP) while preserving access control to memory operand to avoid user disclosure that CLFLUSH is not available.

In embodiments, the Guest User Mode CLFLUSH MSR 220E may include control bits that cause a host user CLFLUSH operation to be interpreted as a cache line writeback (CLWB) operation. In such embodiments, only a write back will occur as a result of a CLFLUSH instruction. Data will remain in the cache unchanged, however the cache line internal tags may be changed from "MODIFIED" to "EXCLUSIVE." Thus, an attacker is unable to bring the cache to a known state. In such embodiments, the semantic of the CLFLUSH is maintained for applications that may use a CLFLUSH operation to perform a write-back to memory.

In some embodiments, the Guest User Mode CLFLUSH MSR 220E may include control bits that cause the processor circuitry 120 to interpret a host user CLFLUSH operation as a combined Cache Line Write Back (CLWB) and Cache Line Demote (CLDEMOTE) operation. This is similar in effect to a CLFLUSH operation, but still prevents an attacker from bringing the cache to a known state in preparation for a timing based, side channel attack since data may remain in the LLC.

Additional values written to the Guest User Mode CLFLUSH MSR 220E include one or more cache line demote (CLDEMOTE) control bits that determine how host user CLDEMOTE operations are handled. The CLDEMOTE control bits may: disable CLDEMOTE; enable CLDEMOTE "as is;" or disable CLDEMOTE globally such that an execution of CLDEMOTE leads to an exception, such as an undefined opcode exception.

In embodiments, to implement the above modified CLFLUSH instructions a new feature bit (e.g., CLFLUSH_DISABLE_CONTROL) may be added to the CPU identifier (CPUID). The BIOS, operating system, and/or virtual machine manager (VMM) would detect the logical state of this additional bit. The modifications to CLFLUSH described herein would generally result in the following: an undefined opcode exception if CLFLUSH is disabled; normal operation if CLFLUSH is enabled; and execution as a Cache Lien Write Back (CLWB) or as a "NO OPERATION" (NOP) as specified by the current execution/privilege mode and control settings.

Figure 3:
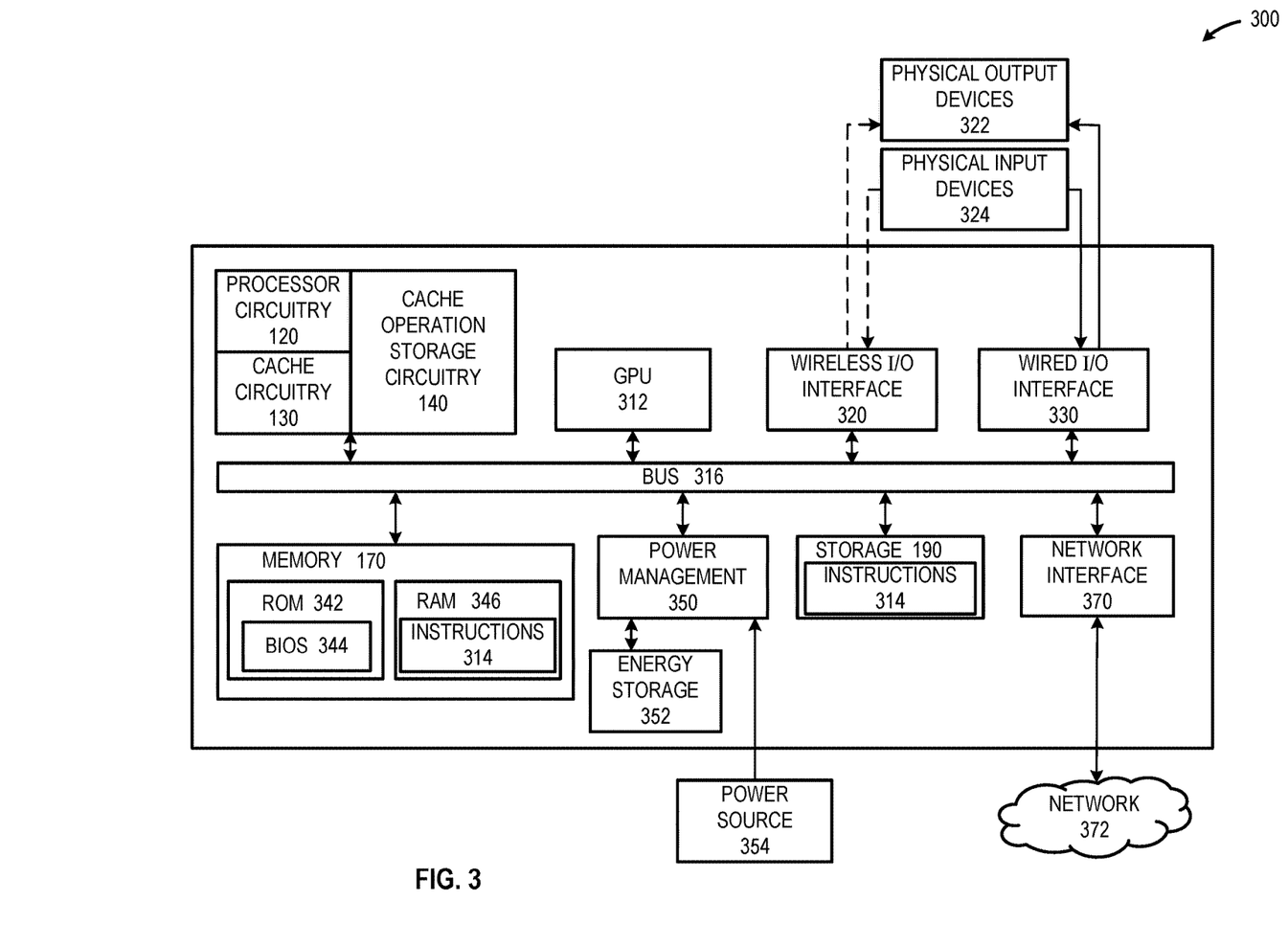
FIG. 3 is a schematic diagram of an illustrative electronic, processor-based, device that includes a CPU having processor circuitry, cache circuitry, and cache operation storage circuitry that modifies the functionality of CLFLUSH and/or CLDEMOTE operations to prevent the use of CLFLUSH to bring the cache circuitry to a known state in preparation for a timing-based side channel attack, in accordance with at least one embodiment described herein.

FIG. 3 is a schematic diagram of an illustrative electronic, processor-based, device 300 that includes a CPU 110 having processor circuitry 120, cache circuitry 130, and cache operation storage circuitry 140 that modifies the functionality of CLFLUSH and/or CLDEMOTE operations to prevent the use of CLFLUSH to bring the cache circuitry 130 to a known state in preparation for a timing-based side channel attack, in accordance with at least one embodiment described herein. The processor-based device 300 may additionally include one or more of the following: a graphical processing unit 312, a wireless input/output (I/O) interface 320, a wired I/O interface 330, system memory 170, power management circuitry 350, a non-transitory storage device 190, and a network interface 370. The following discussion provides a brief, general description of the components forming the illustrative processor-based device 300. Example, non-limiting processor-based devices 300 may include, but are not limited to: smartphones, wearable computers, portable computing devices, handheld computing devices, desktop computing devices, blade server devices, workstations, and similar.

The processor-based device 300 includes processor circuitry 120 and cache operation storage circuitry 140. In operation, the cache operation storage circuitry 140 may be used to selectively enable or disable the CLFLUSH operation for execution by a host or guest and/or a kernel or user application. In operation, the cache operation storage circuitry 140 may provide alternative operations, such as CLDEMOTE and/or CLWB, that are selectively executed in place of the CLFLUSH operation. By selectively disabling the CLFLUSH operation or replacing the CLFLUSH operation with an alternative operation, an attacker is unable to bring the cache circuitry 130 to a known state in preparation for a timing-based side channel attack such as Spectre and Meltdown.

In some embodiments, the processor-based device 300 includes graphics processor circuitry 312 capable of executing machine-readable instruction sets 314 and generating an output signal capable of providing a display output to a system user. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 120 may include any number of hardwired or configurable circuits, some or all of which may include programmable and/or configurable combinations of electronic components, semiconductor devices, and/or logic elements that are disposed partially or wholly in a PC, server, or other computing system capable of executing machine-readable instructions.

The processor-based device 300 includes a bus or similar communications link 316 that communicably couples and facilitates the exchange of information and/or data between various system components including the processor circuitry 120, the graphics processor circuitry 312, one or more wireless I/O interfaces 320, one or more wired I/O interfaces 330, the system memory 170, one or more storage devices 190, and/or one or more network interfaces 370. The processor-based device 300 may be referred to in the singular herein, but this is not intended to limit the embodiments to a single processor-based device 300, since in certain embodiments, there may be more than one processor-based device 300 that incorporates, includes, or contains any number of communicably coupled, collocated, or remote networked circuits or devices.

The processor circuitry 120 may include any number, type, or combination of currently available or future developed devices capable of executing machine-readable instruction sets. The processor circuitry 120 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 3 are of conventional design. Consequently, such blocks need not be described in further detail herein, as they will be understood by those skilled in the relevant art. The bus 316 that interconnects at least some of the components of the processor-based device 300 may employ any currently available or future developed serial or parallel bus structures or architectures.

The system memory 170 may include read-only memory ("ROM") 342 and random access memory ("RAM") 346. At least a portion of the system memory 170 may be apportioned into a kernel memory space 172 and a user memory space 174. A portion of the ROM 342 may be used to store or otherwise retain a basic input/output system ("BIOS") 344. The BIOS 344 provides basic functionality to the processor-based device 300, for example by causing the processor circuitry 120 to load and/or execute one or more machine-readable instruction sets 314. In embodiments, at least some of the one or more machine-readable instruction sets 314 cause at least a portion of the processor circuitry 120 to provide, create, produce, transition, and/or function as a dedicated, specific, and particular machine, for example a word processing machine, a digital image acquisition machine, a media playing machine, a gaming system, a communications device, a smartphone, or similar.

The processor-based device 300 may include at least one wireless input/output (I/O) interface 320. The at least one wireless I/O interface 320 may be communicably coupled to one or more physical output devices 322 (tactile devices, video displays, audio output devices, hardcopy output devices, etc.). The at least one wireless I/O interface 320 may communicably couple to one or more physical input devices 324 (pointing devices, touchscreens, keyboards, tactile devices, etc.). The at least one wireless I/O interface 320 may include any currently available or future developed wireless I/O interface. Example wireless I/O interfaces include, but are not limited to: BLUETOOTH®, near field communication (NFC), and similar.

The processor-based device 300 may include one or more wired input/output (I/O) interfaces 330. The at least one wired I/O interface 330 may be communicably coupled to one or more physical output devices 322 (tactile devices, video displays, audio output devices, hardcopy output devices, etc.). The at least one wired I/O interface 330 may be communicably coupled to one or more physical input devices 324 (pointing devices, touchscreens, keyboards, tactile devices, etc.). The wired I/O interface 330 may include any currently available or future developed I/O interface. Example wired I/O interfaces include, but are not limited to: universal serial bus (USB), IEEE 1394 ("FireWire"), and similar.

The processor-based device 300 may include one or more communicably coupled, non-transitory, data storage devices 190. The data storage devices 190 may include one or more hard disk drives (HDDs) and/or one or more solid-state storage devices (SSDs). The one or more data storage devices 190 may include any current or future developed storage appliances, network storage devices, and/or systems. Non-limiting examples of such data storage devices 190 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 190 may include one or more removable storage devices, such as one or more flash drives, flash memories, flash storage units, or similar appliances or devices capable of communicable coupling to and decoupling from the processor-based device 300.

The one or more data storage devices 190 may include interfaces or controllers (not shown) communicatively coupling the respective storage device or system to the bus 316. The one or more data storage devices 190 may store, retain, or otherwise contain machine-readable instruction sets, data structures, program modules, data stores, databases, logical structures, and/or other data useful to the processor circuitry 120 and/or graphics processor circuitry 312 and/or one or more applications executed on or by the processor circuitry 120 and/or graphics processor circuitry 312. In some instances, one or more data storage devices 190 may be communicably coupled to the processor circuitry 120, for example via the bus 316 or via one or more wired communications interfaces 330 (e.g., Universal Serial Bus or USB); one or more wireless communications interfaces 320 (e.g., Bluetooth®, Near Field Communication or NFC); and/or one or more network interfaces 370 (IEEE 802.3 or Ethernet, IEEE 802.11, or WiFi®, etc.).

Machine-readable instruction sets 314 and other programs, applications, logic sets, and/or modules may be stored in whole or in part in the system memory 170. Such instruction sets 314 may be transferred, in whole or in part, from the one or more data storage devices 190. The instruction sets 314 may be loaded, stored, or otherwise retained in system memory 170, in whole or in part, during execution by the processor circuitry 120 and/or graphics processor circuitry 312. The machine-readable instruction sets 314 may include machine-readable and/or machine-readable code, instructions, or similar logic capable of causing the processor circuitry 120 and/or the cache operation storage circuitry 140 to detect CLFLUSH operations initiated by kernel and/or user applications executed by a host and/or guest system. In embodiments, the machine-readable instruction sets 314 may provide the cache operation storage circuitry 140 the capability to selectively enable/disable the CLFLUSH operation. In embodiments, the machine-readable instruction sets 314 may provide the cache operation storage circuitry 140 the capability to selectively replace the CLFLUSH operation with one or more alternative operations, such as CLDEMOTE or CLWB, or even interpret the CLFLUSH operation as a "NO OPERATION" that generates an undefined opcode exception.

The processor-based device 300 may include power management circuitry 350 that controls one or more operational aspects of the energy storage device 352. In embodiments, the energy storage device 352 may include one or more primary (i.e., non-rechargeable) or secondary (i.e., rechargeable) batteries or similar energy storage devices. In embodiments, the energy storage device 352 may include one or more supercapacitors or ultracapacitors. In embodiments, the power management circuitry 350 may alter, adjust, or control the flow of energy from an external power source 354 to the energy storage device 352 and/or to the processor-based device 300. The power source 354 may include, but is not limited to, a solar power system, a commercial electric grid, a portable generator, an external energy storage device, or any combination thereof.

For convenience, the processor circuitry 120, the graphics processor circuitry 312, the wireless I/O interface 320, the wired I/O interface 330, the system memory 170, the power management circuitry 350, the storage device 190, and the network interface 370 are illustrated as communicatively coupled to each other via the bus 316, thereby providing connectivity between the above-described components. In alternative embodiments, the above-described components may be communicatively coupled in a different manner than illustrated in FIG. 3. For example, one or more of the above-described components may be directly coupled to other components, or may be coupled to each other, via one or more intermediary components (not shown). In another example, one or more of the above-described components may be integrated into the processor circuitry 120, the cache operation storage circuitry 140, and/or the graphics processor circuitry 312. In some embodiments, all or a portion of the bus 316 may be omitted and the components are coupled directly to each other using suitable wired or wireless connections.

Figure 4:
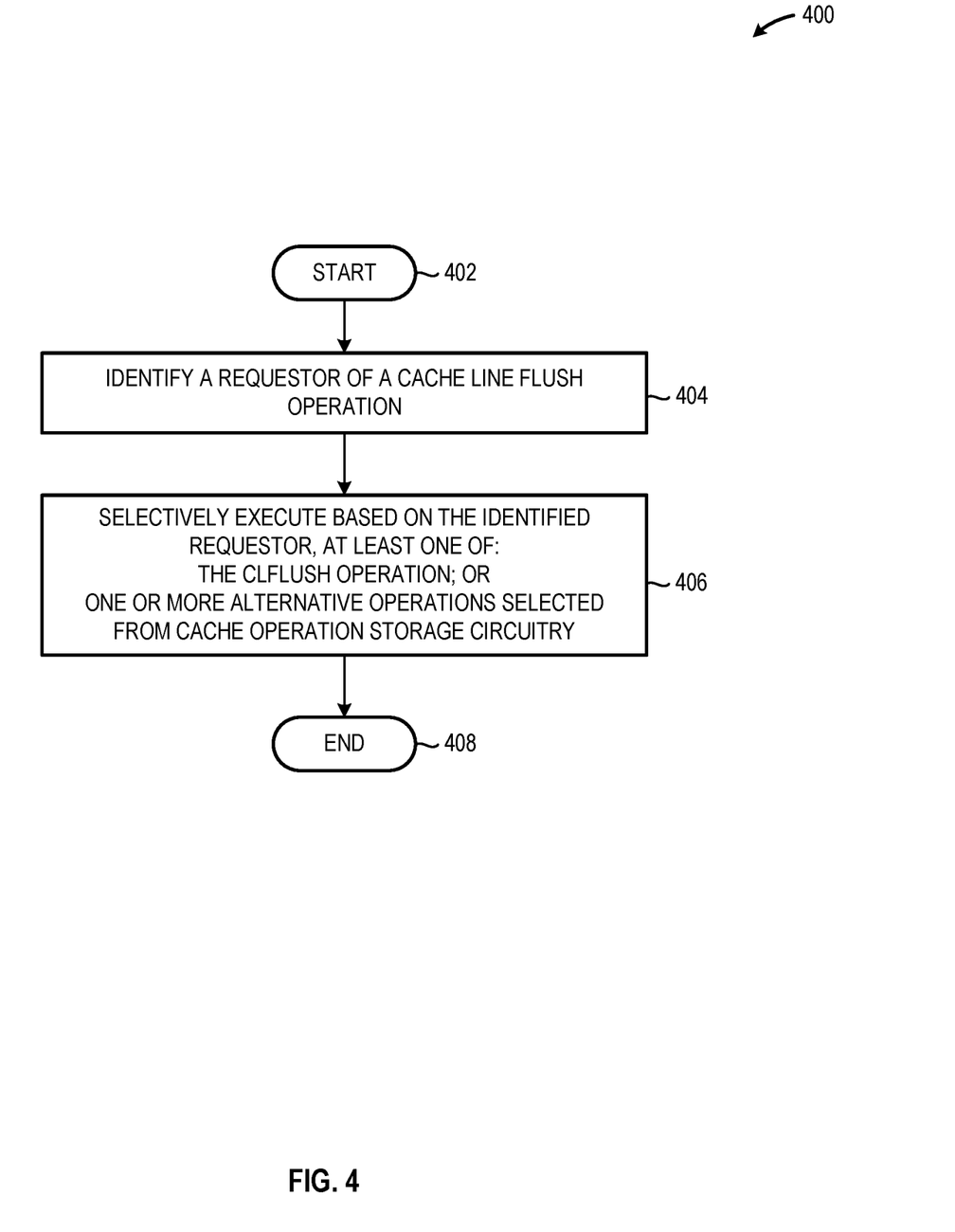
FIG. 4 is a high-level flow diagram of an illustrative method of selectively enabling/disabling or replacing a Cache Line Flush (CLFLUSH) operation based, at least in part, on the identity of the requestor of the CLFLUSH operation, in accordance with at least one embodiment described herein.

FIG. 4 is a high-level flow diagram of an illustrative method 400 of selectively enabling/disabling or replacing a Cache Line Flush (CLFLUSH) operation based, at least in part, on the identity of the requestor of the CLFLUSH operation, in accordance with at least one embodiment described herein. In timing-based, side channel attacks, the attacker must set the cache circuitry 130 to a known state in order to obtain meaningful timing information that permits an inference of the content of a secret memory location. The method 400 beneficially and advantageously selectively alters the functionality of the CLFLUSH operation such that an attacker is unable to set all or a portion of the cache circuitry to a known state. The method 400 commences at 402.

At 404, the cache operation storage circuitry 140 detects a requestor of a Cache Line Flush (CLFLUSH) operation. The requestor may be identified by the cache operation storage circuitry 140 as originating on a host system or on a guest system. The requestor may be identified by the cache operation storage circuitry 140 as either an operation requested by a kernel-level instruction (e.g., generated at the operating system or "Ring 0" level) or as an operation requested by a user-level instruction (e.g., generated by a user-level application or "Ring 1/2/3" level application).

At 406, in some embodiments and based on the identity of the requestor of the CLFLUSH operation, the cache operation storage circuitry 140 may selectively enable or disable the execution of all or a portion of the CLFLUSH operation. In other embodiments, based on the identity of the requestor of the CLFLUSH operation, the cache operation storage circuitry 140 may select one or more alternative operations to execute in place of the requested CLFLUSH operation. The method concludes at 408.

While FIG. 4 illustrates various operations according to one or more embodiments, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods that include cache operation storage circuitry that selectively enables/disables the Cache Line Flush (CLFLUSH) operation. The cache operation storage circuitry may also selectively replace the CLFLUSH operation with one or more replacement operations that provide similar functionality but prevent an attacker from placing processor cache circuitry in a known state during a timing-based, side channel attack such as Spectre or Meltdown. The cache operation storage circuitry includes model specific registers (MSRs) that contain information used to determine whether to enable/disable CLFLUSH functionality. The cache operation storage circuitry may include model specific registers (MSRs) that contain information used to select appropriate replacement operations such as Cache Line Demote (CLDEMOTE) and/or Cache Line Write Back (CLWB) to selectively replace CLFLUSH operations.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for selectively enabling/disabling and/or selectively altering the functionality of the Cache Line Flush (CLFLUSH) operation to render the CLFLUSH operation ineffective at setting the cache circuitry to a known state during a timing-based, side channel attack such as Spectre or Meltdown.

According to example 1, there is provided a CPU Cache instruction substitution system. The system may include: processor circuitry; processor cache circuitry coupled to the processor circuitry; cache operation storage circuitry; a non-transitory storage device that includes machine-readable instructions that, when executed, cause the processor circuitry to, upon receipt of a cache line flush (CLFLUSH) operation: detect an execution mode of a requestor of the CLFLUSH operation; and based on the detected execution mode of the requestor of the CLFLUSH operation, cause an execution of at least one of: the CLFLUSH operation; or one or more alternative operations selected from the cache operation storage circuitry in place of the CLFLUSH operation.

Example 2 may include elements of example 1 where the machine-readable instructions that cause the processor circuitry to cause an execution of one or more alternative operations selected from the cache operation storage circuitry in place of the CLFLUSH operation based on the detected requestor of the CLFLUSH operation cause the processor circuitry to: execute at least one of: a no operation (NOP); a cache line write back (CLWB) operation; or a CLWB operation combined with a cache line demote (CLDEMOTE) operation where the detected execution mode of the requestor includes user mode on a host machine.

Example 3 may include elements of any of examples 1 or 2 where the machine-readable instructions that cause the processor circuitry to cause an execution of one or more alternative operations selected from the cache operation storage circuitry in place of the CLFLUSH operation based on the detected requestor of the CLFLUSH operation cause the processor circuitry to: execute at least one of: a no operation (NOP); a cache line write back (CLWB) operation; a CLWB operation combined with a cache line demote (CLDEMOTE) operation; a CLFLUSH operation on a trusted platform that includes the processor circuitry; or a CLFLUSH operation on a defined portion of the processor cache circuitry where the detected execution mode of the requestor includes a kernel mode in a guest virtual machine.

Example 4 may include elements of any of examples 1 through 3 where the machine-readable instructions that cause the processor circuitry to cause an execution of one or more alternative operations selected from the cache operation storage circuitry in place of the CLFLUSH operation based on the detected requestor of the CLFLUSH operation cause the processor circuitry to: execute at least one of: a no operation (NOP); a cache line write back (CLWB) operation; or a CLWB operation combined with a cache line demote (CLDEMOTE) operation where the detected execution mode of the requestor includes a user mode in a guest virtual machine.

Example 5 may include elements of any of examples 1 through 4 where the machine-readable instructions that cause the processor circuitry to cause an execution of the CLFLUSH operation based on the detected requestor of the CLFLUSH operation cause the processor circuitry to: execute the CLFLUSH operation where the detected execution mode of the requestor includes a kernel mode on a host machine.

According to example 6, there is provided a CPU Cache instruction substitution method. The method may include: detecting, by processor circuitry, an execution mode of a requestor of a CLFLUSH operation; and selectively executing by the processor circuitry, based on the detected execution mode of the requestor of the CLFLUSH operation, at least one of: the CLFLUSH operation; or one or more alternative operations in place of the CLFLUSH operation the one or more alternative operations selected from cache operation storage circuitry coupled to the processor circuitry.

Example 7 may include elements of example 6 where executing the one or more alternative operations in place of the CLFLUSH operation based on the detected requestor of the CLFLUSH operation comprises: executing, by the processor circuitry, at least one of: a no operation (NOP); a cache line write back (CLWB) operation; or a CLWB operation combined with a cache line demote (CLDEMOTE) operation in response to the detected execution mode of the requestor including a user mode on a host machine.

Example 8 may include elements of any of examples 6 or 7 where executing the one or more alternative operations in place of the CLFLUSH operation based on the detected requestor of the CLFLUSH operation comprises: executing, by the processor circuitry, at least one of: a no operation (NOP); a cache line write back (CLWB) operation; a CLWB operation combined with a cache line demote (CLDEMOTE) operation; a CLFLUSH operation on a trusted platform that includes the processor circuitry; or a CLFLUSH operation on a defined portion of the processor cache circuitry in response to the detected execution mode of the requestor including a kernel-level instruction executed by a guest device.

Example 9 may include elements of any of examples 6 through 8 where executing the one or more alternative operations in place of the CLFLUSH operation based on the detected requestor of the CLFLUSH operation comprises: executing, by the processor circuitry, at least one of: a no operation (NOP); a cache line write back (CLWB) operation; or a CLWB operation combined with a cache line demote (CLDEMOTE) operation in response to the detected execution mode of the requestor including a user application executed on a guest device.

Example 10 may include elements of any of examples 6 through 9 where executing the CLFLUSH operation based on the detected requestor of the CLFLUSH operation comprises: executing, by the processor circuitry, the CLFLUSH operation in response to the detected execution mode of the requestor including a kernel level instruction executed on a host device.

According to example 11, there is provided a CPU Cache instruction substitution system. The system may include: means for detecting an execution mode of the requestor of a CLFLUSH operation; and means for selectively executing, based on the detected execution mode of the requestor of the CLFLUSH operation, at least one of: the CLFLUSH operation; or one or more alternative operations in place of the CLFLUSH operation the one or more alternative operations selected from cache operation storage circuitry coupled to the processor circuitry.

Example 12 may include elements of example 11 where the means for selectively executing the one or more alternative operations in place of the CLFLUSH operation based on the detected execution mode of the requestor of the CLFLUSH operation comprises: means for selectively executing at least one of: a no operation (NOP); a cache line write back (CLWB) operation; or a CLWB operation combined with a cache line demote (CLDEMOTE) operation in response to the detected execution mode of the requestor including a user mode on a host machine.

Example 13 may include elements of any of examples 11 or 12 where the means for selectively executing the one or more alternative operations in place of the CLFLUSH operation based on the detected execution mode of the requestor of the CLFLUSH operation comprises: means for selectively executing at least one of: a no operation (NOP); a cache line write back (CLWB) operation; a CLWB operation combined with a cache line demote (CLDEMOTE) operation; a CLFLUSH operation on a trusted platform that includes the processor circuitry; or a CLFLUSH operation on a defined portion of the processor cache circuitry in response to the detected execution mode of the requestor including a kernel mode in a guest virtual machine.

Example 14 may include elements of any of examples 11 through 13 where the means for selectively executing the one or more alternative operations in place of the CLFLUSH operation based on the detected execution mode of the requestor of the CLFLUSH operation comprises: means for selectively executing at least one of: a no operation (NOP); a cache line write back (CLWB) operation; or a CLWB operation combined with a cache line demote (CLDEMOTE) operation in response to the detected execution mode of the requestor including a user mode in a guest virtual machine.

Example 15 may include elements of any of examples 11 through 14 where the means for selectively executing the CLFLUSH operation based on the detected execution mode of the requestor of the CLFLUSH operation comprises: means for selectively executing the CLFLUSH operation in response to the detected execution mode of the requestor including a kernel mode on a host machine.

According to example 16, there is provided a non-transitory machine-readable storage medium containing instructions. The machine-readable instructions, when executed by processor circuitry, cause the processor circuitry to: detect an execution mode of the requestor of a CLFLUSH operation; and selectively execute, based on the detected execution mode of the requestor of the CLFLUSH operation, at least one of: the CLFLUSH operation; or one or more alternative operations in place of the CLFLUSH operation the one or more alternative operations selected from cache operation storage circuitry coupled to the processor circuitry.

Example 17 may include elements of example 16 where the instructions that cause the processor circuitry to selectively execute the one or more alternative operations in place of the CLFLUSH operation based on the detected execution mode of the requestor of the CLFLUSH operation cause the processor circuitry to: selectively execute at least one of: a no operation (NOP); a cache line write back (CLWB) operation; or a CLWB operation combined with a cache line demote (CLDEMOTE) operation in response to the detected execution mode of the requestor including a user mode on a host device.

Example 18 may include elements of any of examples 16 or 17 where the instructions that cause the processor circuitry to selectively execute the one or more alternative operations in place of the CLFLUSH operation based on the detected execution mode of the requestor of the CLFLUSH operation cause the processor circuitry to: selectively execute at least one of: a no operation (NOP); a cache line write back (CLWB) operation; a CLWB operation combined with a cache line demote (CLDEMOTE) operation; a CLFLUSH operation on a trusted platform that includes the processor circuitry; or a CLFLUSH operation on a defined portion of the processor cache circuitry in response to the detected execution mode of the requestor including a kernel mode in a guest virtual machine.

Example 19 may include elements of any of examples 16 through 18 where the instructions that cause the processor circuitry to selectively execute the one or more alternative operations in place of the CLFLUSH operation based on the detected execution mode of the requestor of the CLFLUSH operation cause the processor circuitry to: selectively execute at least one of: a no operation (NOP); a cache line write back (CLWB) operation; or a CLWB operation combined with a cache line demote (CLDEMOTE) operation in response to the detected execution mode of the requestor including a user mode in a guest virtual machine.

Example 20 may include elements of any of examples 16 through 19 where the instructions that cause the processor circuitry to selectively execute the CLFLUSH operation based on the detected execution mode of the requestor of the CLFLUSH operation cause the processor circuitry to: selectively execute the CLFLUSH operation in response to the detected execution mode of the requestor including a kernel mode on a host device.

According to example 21, there is provided an electronic device. The electronic device may include: a printed circuit board; processor circuitry coupled to the printed circuit board; processor cache circuitry coupled to the processor circuitry; cache control instruction storage circuitry; a non-transitory storage device that includes machine-readable instructions that, when executed, cause the processor circuitry to, upon receipt of a cache line flush (CLFLUSH) operation: detect an execution mode of the requestor of the CLFLUSH operation; and based on the detected execution mode of the requestor of the CLFLUSH operation, cause an execution of at least one of: the CLFLUSH operation; or one or more alternative operations selected from the cache operation storage circuitry in place of the CLFLUSH operation.

Example 22 may include elements of example 21 where the machine-readable instructions that cause the execution of one or more alternative operations selected from the cache operation storage circuitry in place of the CLFLUSH operation cause the processor circuitry to: execute of at least one of: a no operation (NOP); a cache line write back (CLWB) operation; or a CLWB operation combined with a cache line demote (CLDEMOTE) operation where the detected execution mode of the requestor includes a user mode on a host device.

Example 23 may include elements of any of examples 21 or 22 where the machine-readable instructions that cause the execution of one or more alternative operations selected from the cache operation storage circuitry in place of the CLFLUSH operation cause the processor circuitry to: execute of at least one of: a no operation (NOP); a cache line write back (CLWB) operation; a CLWB operation combined with a cache line demote (CLDEMOTE) operation; a CLFLUSH operation on a trusted platform that includes the processor circuitry; or a CLFLUSH operation on a defined portion of the processor cache circuitry where the detected execution mode of the requestor includes a kernel mode in a guest virtual machine.

Example 24 may include elements of any of examples 21 through 23 where the machine-readable instructions that cause the execution of one or more alternative operations selected from the cache operation storage circuitry in place of the CLFLUSH operation cause the processor circuitry to: execute of at least one of: a no operation (NOP); a cache line write back (CLWB) operation; or a CLWB operation combined with a cache line demote (CLDEMOTE) operation where the detected execution mode of the requestor includes a user mode in a guest virtual machine.

Example 25 may include elements of any of examples 21 through 24 where the machine-readable instructions that cause the processor circuitry to cause an execution of the CLFLUSH operation based on the detected execution mode of the requestor of the CLFLUSH operation cause the processor circuitry to: execute of the CLFLUSH operation where the detected execution mode of the requestor includes a kernel mode on a host device.

According to example 26, there is provided a system for selectively executing one or more alternative operations in place of a Cache Line Flush (CLFLUSH) operation, the system being arranged to perform the method of any of examples 6 through 10.

According to example 27, there is provided a chipset arranged to perform the method of any of examples 6 through 10.

According to example 28, there is provided at least one non-transitory machine readable medium comprising a plurality of instructions that, in response to be being executed on a processor-based device, cause the computing device to carry out the method according to any of examples 6 through 10.

According to example 29, there is provided a device configured for selectively executing one or more alternative operations in place of a Cache Line Flush (CLFLUSH) operation, the device being arranged to perform the method of any of the examples 6 through 10.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A CPU Cache instruction substitution system, comprising:
    processor circuitry
    processor cache circuitry coupled to the processor circuitry;
    cache operation storage circuitry;
    a non-transitory storage device that includes machine-readable instructions that, when executed, cause the processor circuitry to, upon receipt of a cache line flush (CLFLUSH) operation from a kernel executed by the processor circuitry:
        determine whether the kernel requesting the CLFLUSH operation is in a trusted execution mode; and
        based on the detected execution mode of the requestor of the CLFLUSH operation, cause an execution of at least one of:
            the CLFLUSH operation responsive to a determination that the kernel requesting the CLFLUSH operation is in a trusted execution mode; or
            one or more alternative operations selected from the cache operation storage circuitry in place of the CLFLUSH operation responsive to a determination that the kernel requesting the CLFLUSH operation is not in a trusted execution mode.

2. The system of claim 1 wherein the machine-readable instructions that cause the processor circuitry to cause an execution of one or more alternative operations selected from the cache operation storage circuitry in place of the CLFLUSH operation responsive to a determination that the kernel requesting the CLFLUSH operation is not in a trusted execution mode cause the processor circuitry to:
    execute at least one of: a no operation (NOP); a cache line write back (CLWB) operation; or a CLWB operation combined with a cache line demote (CLDEMOTE) operation responsive to a determination that a host kernel requesting the CLFLUSH operation is not in a trusted execution mode.

3. The system of claim 1 wherein the machine-readable instructions that cause the processor circuitry to cause an execution of one or more alternative operations selected from the cache operation storage circuitry in place of the CLFLUSH operation responsive to a determination that the processor circuitry is not in a trusted execution mode cause the processor circuitry to:
    execute at least one of: a no operation (NOP); a cache line write back (CLWB) operation; a CLWB operation combined with a cache line demote (CLDEMOTE) operation; a CLFLUSH operation on a trusted platform that includes the processor circuitry; or a CLFLUSH operation on a defined portion of the processor cache circuitry responsive to a determination that a kernel in a guest virtual machine requesting the CLFLUSH operation is not in a trusted execution mode.

4. A CPU Cache instruction substitution method, comprising:
determining, by processor circuitry, whether a kernel executed by the processor circuitry and requesting a CLFLUSH operation is in a trusted execution mode; and
selectively executing by the processor circuitry, based on the detected execution mode of the requestor of the CLFLUSH operation, at least one of:
the CLFLUSH operation responsive to a determination that the kernel requesting the CLFLUSH operation is in a trusted execution mode; or
one or more alternative operations in place of the CLFLUSH operation the one or more alternative operations selected from cache operation storage circuitry coupled to the processor circuitry responsive to a determination that the kernel requesting the CLFLUSH operation is not in a trusted execution mode.

5. The method of claim 4 wherein executing the one or more alternative operations in place of the CLFLUSH operation based on the detected requestor of the CLFLUSH operation comprises:
executing, by the processor circuitry, at least one of: a no operation (NOP); a cache line write back (CLWB) operation; or a CLWB operation combined with a cache line demote (CLDEMOTE) operation responsive to a determination that a host kernel requesting the CLFLUSH operation is not in a trusted execution mode.

6. The method of claim 4 wherein executing the one or more alternative operations in place of the CLFLUSH operation based on the detected requestor of the CLFLUSH operation comprises:
executing, by the processor circuitry, at least one of: a no operation (NOP); a cache line write back (CLWB) operation; a CLWB operation combined with a cache line demote (CLDEMOTE) operation; a CLFLUSH operation on a trusted platform that includes the processor circuitry; or a CLFLUSH operation on a defined portion of the processor cache circuitry responsive to a determination that a guest kernel requesting the CLFLUSH operation is not in a trusted execution mode.

7. A CPU Cache instruction substitution system, comprising:
means for determining whether a kernel executed by processor circuitry and requesting a CLFLUSH operation is in a trusted execution mode; and
means for selectively executing, based on the detected execution mode of the requestor of the CLFLUSH operation, at least one of:
the CLFLUSH operation responsive to a determination that the kernel requesting the CLFLUSH operation is in a trusted execution mode; or
one or more alternative operations in place of the CLFLUSH operation the one or more alternative operations selected from cache operation storage circuitry coupled to the processor circuitry responsive to a determination that the kernel requesting the CLFLUSH operation is not in a trusted execution mode.

8. The system of claim 7 wherein the means for selectively executing the one or more alternative operations in place of the CLFLUSH operation based on the detected execution mode of the requestor of the CLFLUSH operation comprises:
means for selectively executing at least one of: a no operation (NOP); a cache line write back (CLWB) operation; or a CLWB operation combined with a cache line demote (CLDEMOTE) operation responsive to a determination that a host kernel requesting the CLFLUSH operation is not in a trusted execution mode.

9. The system of claim 7 wherein the means for selectively executing the one or more alternative operations in place of the CLFLUSH operation based on the detected execution mode of the requestor of the CLFLUSH operation comprises:
means for selectively executing at least one of: a no operation (NOP); a cache line write back (CLWB) operation; a CLWB operation combined with a cache line demote (CLDEMOTE) operation; a CLFLUSH operation on a trusted platform that includes the processor circuitry; or a CLFLUSH operation on a defined portion of the processor cache circuitry responsive to a determination that a guest kernel requesting the CLFLUSH operation is not in a trusted execution mode.

10. A non-transitory machine-readable storage medium containing instructions that, when executed by processor circuitry, cause the processor circuitry to:
determine whether a kernel executed by the processor circuitry and requesting a CLFLUSH operation is in a trusted execution mode; and
selectively execute, based on the detected execution mode of the requestor of the CLFLUSH operation, at least one of:
the CLFLUSH operation responsive to a determination that the kernel requesting the CLFLUSH operation is in a trusted execution mode; or
one or more alternative operations in place of the CLFLUSH operation the one or more alternative operations selected from cache operation storage circuitry coupled to the processor circuitry responsive to a determination that the kernel requesting the CLFLUSH operation is not in a trusted execution mode.

11. The non-transitory machine-readable storage medium of claim 10 wherein the instructions that cause the processor circuitry to selectively execute the one or more alternative operations in place of the CLFLUSH operation based on the detected execution mode of the requestor of the CLFLUSH operation cause the processor circuitry to:
selectively execute at least one of: a no operation (NOP); a cache line write back (CLWB) operation; or a CLWB operation combined with a cache line demote (CLDEMOTE) operation responsive to a determination that a host kernel requesting the CLFLUSH operation is not in a trusted execution mode.

12. The non-transitory machine-readable storage medium of claim 10 wherein the instructions that cause the processor circuitry to selectively execute the one or more alternative operations in place of the CLFLUSH operation based on the detected execution mode of the requestor of the CLFLUSH operation cause the processor circuitry to:
selectively execute at least one of: a no operation (NOP); a cache line write back (CLWB) operation; a CLWB operation combined with a cache line demote (CLDEMOTE) operation; a CLFLUSH operation on a trusted platform that includes the processor circuitry; or a CLFLUSH operation on a defined portion of the processor cache circuitry responsive to a determination that a guest kernel requesting the CLFLUSH operation is not in a trusted execution mode.

13. An electronic device, comprising:
a printed circuit board;
processor circuitry coupled to the printed circuit board;
processor cache circuitry coupled to the processor circuitry;
cache control instruction storage circuitry;
a non-transitory storage device that includes machine-readable instructions that, when executed, cause the processor circuitry to, upon receipt of a cache line flush (CLFLUSH) operation from a kernel executed by the processor circuitry:
determine whether the kernel requesting the CLFLUSH operation is in a trusted execution mode; and
based on the detected execution mode of the requestor of the CLFLUSH operation, cause an execution of at least one of:
the CLFLUSH operation responsive to a determination that the kernel requesting the CLFLUSH operation is not in a trusted execution mode; or
one or more alternative operations selected from the cache operation storage circuitry in place of the CLFLUSH operation responsive to a determination that a guest kernel requesting the CLFLUSH operation is not in a trusted execution mode.

14. The electronic device of claim 13 wherein the machine-readable instructions that cause the execution of one or more alternative operations selected from the cache operation storage circuitry in place of the CLFLUSH operation cause the processor circuitry to:
execute of at least one of: a no operation (NOP); a cache line write back (CLWB) operation; or a CLWB operation combined with a cache line demote (CLDEMOTE) operation responsive to a determination that a guest kernel requesting the CLFLUSH operation is not in a trusted execution mode.

15. The electronic device of claim 13 wherein the machine-readable instructions that cause the execution of one or more alternative operations selected from the cache operation storage circuitry in place of the CLFLUSH operation cause the processor circuitry to:
execute of at least one of: a no operation (NOP); a cache line write back (CLWB) operation; a CLWB operation combined with a cache line demote (CLDEMOTE) operation; a CLFLUSH operation on a trusted platform that includes the processor circuitry; or a CLFLUSH operation on a defined portion of the processor cache circuitry responsive to a determination that a guest kernel requesting the CLFLUSH operation is in a trusted execution mode.

* * * * *